United States Patent [19]
McLelland

[11] Patent Number: 5,103,916
[45] Date of Patent: Apr. 14, 1992

[54] DIFFERENTIAL FIRE AND EXPLOSION PROTECTION SYSTEM

[75] Inventor: Bruce McLelland, Blue Springs, Mo.

[73] Assignee: Fike Corporation, Blue Springs, Mo.

[21] Appl. No.: 765,482

[22] Filed: Sep. 23, 1991

Related U.S. Application Data

[63] Continuation-in-part of Ser. No. 547,598, Jul. 2, 1990, abandoned.

[51] Int. Cl.⁵ ............................................. A62C 37/10
[52] U.S. Cl. ....................................... 169/61; 340/589
[58] Field of Search .......................... 169/54, 56, 61; 340/589, 596

[56] References Cited

U.S. PATENT DOCUMENTS 2,769,879  11/1956  steiner ..................... 340/589 X
4,637,473   1/1987  Gillis et al. ..................... 169/61

FOREIGN PATENT DOCUMENTS 2741767  5/1978  Fed. Rep. of Germany ...... 340/589
2430049  1/1980  France ............................... 340/589

Primary Examiner—Johnny D. Cherry
Assistant Examiner—Andrew C. Pike
Attorney, Agent, or Firm—Hovey, Williams, Timmons & Collins

[57] ABSTRACT

A differential fire and explosioin protection system is for a containment enclosure which receives pneumatically conveyed process air containing a combustible media. A pair of temperature sensors located in opposed relationship in the outlet duct of containment enclosure are responsive to changes in the outflow temperature at different rates. One temperature sensor has a thin metallic sheathed probe, while the other sensor is provided with a relatively thick wall sleeve in surrounding relationship to the probe. Control means connected to the temperature sensors is adapted to activate fire and/or explosion suppression or isolation equipment in response to a predetermined differential in temperature as sensed by the sensors during a certain time interval.

13 Claims, 1 Drawing Sheet

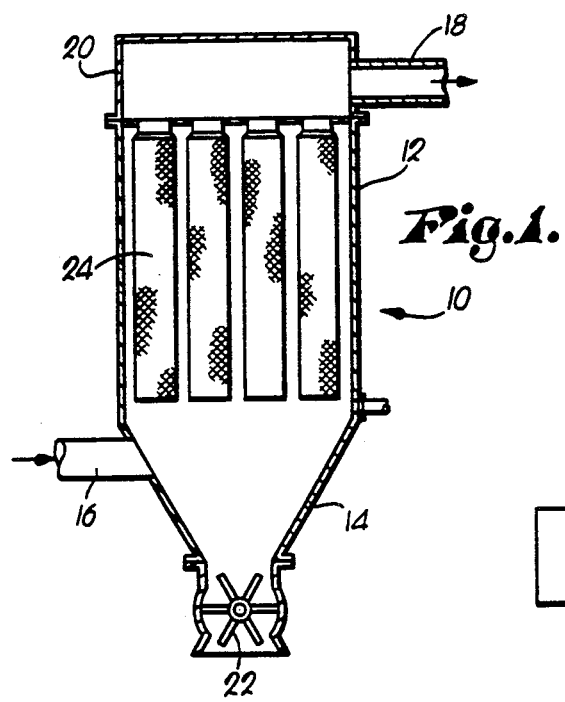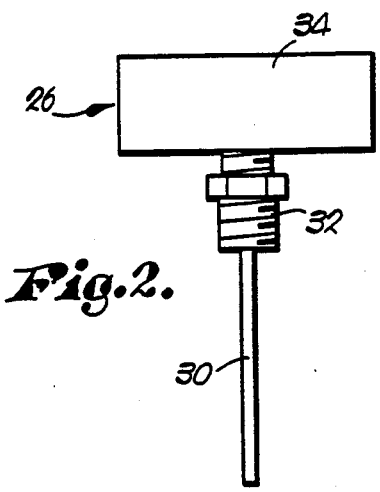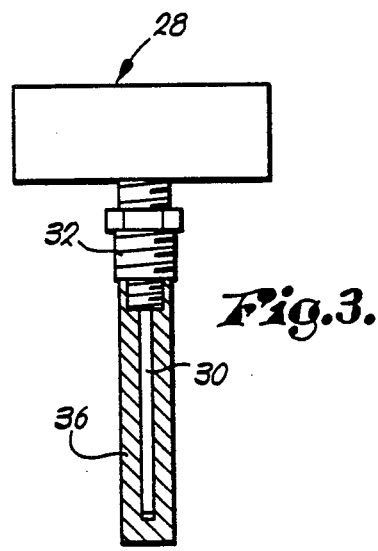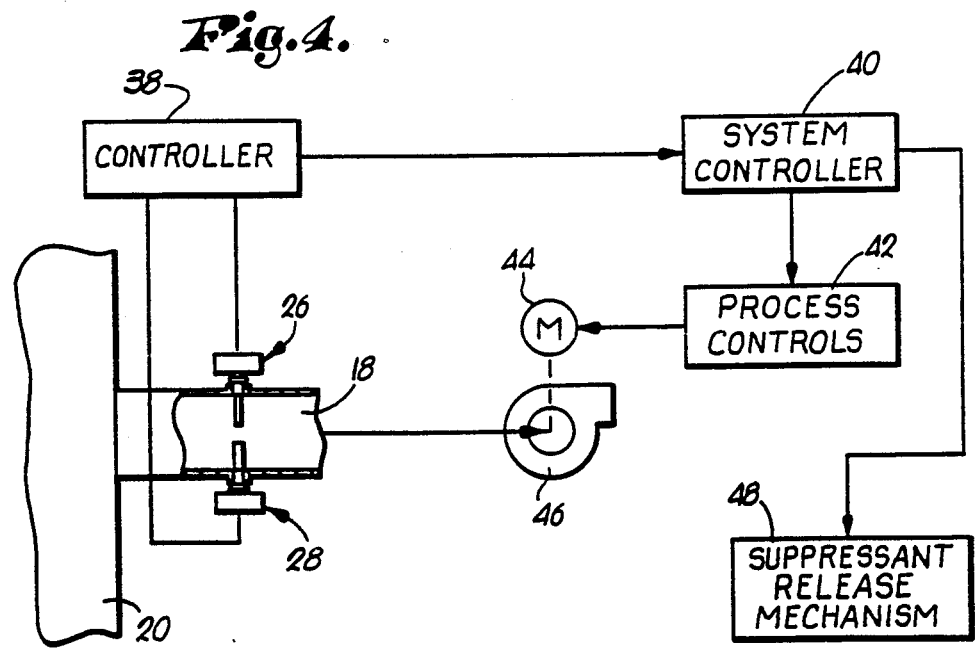

DIFFERENTIAL FIRE AND EXPLOSION PROTECTION SYSTEM

This application is a continuation-in-part of identically titled application Ser. No. 07/547,598 filed July 2, 1990, now abandoned.

BACKGROUND OF THE INVENTION

1. Field of the Invention

This invention relates to a fire and/or explosion suppression system for process equipment wherein a pneumatic transport stream contains suspended potentially combustible material which is removed before the air is discharged to the atmosphere, but presents a fire or explosion hazard until such removal has been accomplished.

Low strength containment and process vessels used in dust collectors, process equipment, dryers, ovens, mills, bucket elevators, storage bins, hoppers, and similar devices are subject to catastrophic destruction if a fire and/or explosion occurs in the vessel, or enclosure, or adjacent conveying ducts or pipes, or associated processing units.

It is desirable though to avoid activation of fire and/or explosion suppression or isolation equipment unless there is verification of the occurrence of an untoward event.

In certain instances, there is a requirement that a blower forcing air through the containment enclosure be turned off as a means to stop further progress of a fire or explosion before release of a suppressant is effective because many times a fire will diminish as soon as the air flow is significantly reduced.

2. Description of the Prior Art

U.S. Pat. No. 4,637,473 discloses a fire suppression system for containment vessels wherein thermocouple temperature sensors are located at the inlet and outlet respectively of the vessel in order to sense a temperature differential therebetween. When a predetermined temperature difference occurs between the temperature of air at the inlet as compared to the air temperature at the outlet of the vessel, the blower fan is turned off. Another temperature sensor inside of the vessel controls release of a suppressant medium into the interior of the vessel.

Although the protection system of the '473 patent is useful in certain instances, normal fluctuations from time to time of the temperature of the air directed to the processing vessel detract from the overall reliability of the design. In certain instances, the sensors are unable to adequately react to temperature differentials throughout the entire temperature operating range to which the system is subjected.

SUMMARY OF THE INVENTION

The fire and/or explosion protection system of the present invention is especially adapted for controlling the operation of explosion suppression or isolation equipment which protects limited strength containment vessels or structures forming a part of processing equipment involving low pressure fluid flow streams containing particulate materials or the like. For example, particles may be removed from the air stream by filtration, centrifugation, or by employment of other types air cleaning equipment and apparatus.

A pair of temperature responsive thermocouples are mounted on the air outlet duct of the containment vessel or enclosure in disposition such that the thermocouples are horizontally aligned in facing, directly opposed, spaced relationship. One of the thermocouples has a thin metal sheath while the other thermocouple is sheathed in a relatively heavy walled metal sleeve. By virtue of this construction, the thin metal sheathed thermocouple responds to temperature changes in the air flowing there past at a substantially greater rate than the thick wall sheathed thermocouple.

The thermocouples are connected to a controller forming a part of fire suppression and/or isolation equipment. The controller is programmed so that a predetermined temperature differential must be sensed by the thermocouples within a specific period of time before the blower system connected to the containment vessel or enclosure is deactivated. Similarly, a prescribed temperature differential must exist in a certain time interval for the controller to send a signal to suppressant apparatus for effecting release of the suppressant into the interior of the vessel or enclosure.

The temperature responsive thermocouples when coupled to the controller, provide for more reliable operation than has heretofore been available at a reasonable cost.

BRIEF DESCRIPTION OF THE DRAWINGS

FIG. 1 is fragmentary, essentially schematic, vertical cross-sectional view of an exemplary containment vessel forming a part of a processing system wherein air containing particulate materials is directed into the vessel for removal of particulate materials therefrom before discharge of the air into the atmosphere;

FIG. 2 is a plan view of one of the temperature responsive thermocouples utilized in carrying out the present invention and in this case having a relatively thin walled metal sheath over the probe of the thermocouple;

FIG. 3 is a plan view similar to FIG. 2 but showing another temperature responsive thermocouple of the invention, and this instance having a relatively thick walled metal sleeve over the thermocouple probe; and FIG. 4 is an essentially schematic representation of the thermocouples of FIGS. 2 and 3 mounted in a preferred position on the outlet duct of the containment vessel depicted in FIG. 1, with the thermocouples being included in a system for controlling deactivation of a process blower which feeds air containing particulate materials into the containment vessel for removal of such particulates, and/or to activate a suppressant release unit.

DESCRIPTION OF THE PREFERRED EMBODIMENT

Many industrial processes which involve the handling of combustible dusts, gases, liquids or a combination of potentially hazardous media, employ pneumatic systems to transport materials or exhaust vapors. For example, it is conventional in this respect to utilize a containment vessel such as a bag house having a number of filtration units therein to filter process air discharged from grinding operations or similar processing procedures, before the air is released to the atmosphere.

Combustion of the particulate materials in the air stream delivered to the containment vessel is an ever present concern when flammable substances must be handled in the overall processing operation. In order to reduce or eliminate the possibility of a catastrophic accident, it is essential to detect and suppress a fire or explosion at the very earliest stages of initiation.

When combustion occurs under air flow conditions, a significant delay in automatic heat detection can readily occur. By the time fire is detected, a raging blaze will likely have engulfed the process and destroyed the equipment, or vessels such as containment enclosures will literally have been blown apart.

In order to reduce the damage and loss caused by combustion which leads to an uncontrolled fire, or even explosions which are in reality very fast burning fires, early fire detection, signalling of an alarm, shut down of pneumatic conveying devices, and release of a suppressant agent should be accomplished in accordance with a prescribed time and event sequence. Thus, there is a need for apparatus capable of detecting an abnormal temperature conditon other than normal temperature fluctuations in the process, and to then ascertain whether the rising temperature can be controlled by simply deactivating the process blower, or release of a suppressant is required.

The present invention accomplishes these goals. FIG. 1 is an essentially schematic representation of a containment vessel 10 in the nature of a bag house or equivalent structure having a rectangular upright housing 12 closed at the bottom by an inverted trapezoidal collector 14. An air inlet duct 16 is connected to collector 14 while an outlet duct 18 extends from the manifold 20 overlying housing 12. A rotatable, multi-vaned gate valve 22 at the bottom of collector 14 prevents escape of significant quantities of air while releasing solid materials that accumulate in the bottom of collector 14, to a collection area below the vessel 10. A series of fabric filters 24 within the interior of housing 12 remove particulate materials from the air stream before the air is released into the atmosphere via manifold 20 and then discharge duct 18.

A pair of thermally sensitive thermocouples 26 and 28 are mounted on duct 18 adjacent the point of connection thereof to the manifold 20. Thermocouple 26 has a temperature sensitive probe made up of bimetallic components housed within an elongated, generally cylindrical, thin walled metal sheath 30. The temperature sensitive components and sheath 30 are supported by an externally threaded fitting 32 mounted on thermocouple housing 34. It can be seen from FIG. 4 that fitting 32 is threaded into a suitable receptacle therefor in the sidewall of duct 18.

Thermocouple 28 on the other hand is identical to thermocouple 26 except that a thick walled metal sleeve 36 is mounted in overlying, surrounding relationship to the sheath 30 of such thermocouple. In this instance, the fitting 32 of thermocouple 28 is threaded into a receptacle therefor in the sidewall of duct 18 directly opposite thermocouple 26.

The sheaths 30 of thermocouples 26 and 28 are preferably of relatively thin metal material with a preferred embodiment having a wall thickness of about 0.015 inch. The wall thickness of sleeve 36 is desirably within the range of about $\frac{1}{8}$ to $\frac{1}{2}$ inch with a preferred thickness being about $\frac{1}{4}$ inch. Thus, it can be seen that the diameter of member 36 is at least twice the diameter of one of the probes 26 and 28.

It is to be observed from FIG. 4 that thermocouples 26 and 28 are if a length such that they can be mounted on duct 18 in disposition with the longitudinal axis of respective sheaths 30 in end-to-end spaced, axial alignment. In addition, the outermost ends of thermocouples 26 and 28 are in horizontally spaced relationship. Finally, it can be seen that the thermocouples 26 and 28 are located so that they are horizontally aligned in opposed sidewalls of duct 18. It can be seen from FIG. 4 of the drawings that the probes 26 and 28 are disposed in locations such that the air flowing past each probe is at essentially the same temperature at any one point and time, but the probes are spaced such that they never come into contact with one another during any temperature conditions to which the probes may be exposed. Thus, the temperature sensing thermocouples 26 and 28 should be located in proximal relationship, but spaced from one another a sufficient distance to preclude contact therebetween during any temperature rise in the air as sensed by both of the probes 26 and 28. It is to be understood though, that the temperature detection system is useful for various duct orientations, including a vertical duct with the probes being located in horizontally aligned relationship across the vertical duct.

The thermocouples 26 and 28 are connected to a millivolt alarm (MVA) controller 38 which in turn is operably connected to system controller 40. If desired, the system controller can be connected directly to the process controls 42 which in turn is coupled to the motor 44 of process blower 46. System controller 38 may also be connected to suppressant release mechanism 48.

The system controller 38 may for example be of the type available from Moore Industries—International, Inc. Sepulveda, Calif. 91343. The controller has two input terminals which for convenience may be designated as +In and −In. The + and −In terminals are adapted to be connected to the thermocouples 26 and 28. As can be appreciated, each of the thermocouples 26 and 28 conventionally has two leads, one of which may be designated as the positive lead and the other as the negative lead. The two negative leads of the thermocouples 26 and 28 are connected one to another. The two positive leads of thermocouples 26 and 28 are joined to the +In and −In terminals of the controller 38. By interconnecting the negative leads of the probes 26 and 28, and by joining the positive leads to terminals +In and −In of the controller 38, the voltage of the probe 26 is in effect subtractive from what amounts to a reference voltage from the probe 28. That is to say, the output voltage from the positive thermocouple lead represents the differential temperatures of thermocouples 26 and 28.

The +In and −In terminals of the Moore controller lead to an input buffer which smooths out the voltage input signals received from thermocouples 26 and 28. The output from the buffer is joined to one input terminal of an "upper" comparator and to one input terminal of a "lower" comparator. An adjustable device such as a potentiometer or an equivalent device is connected in a line leading to the other input terminals of the upper and lower comparators respectively. The adjustable device allows the reference voltage to be adjusted for a particular application of the thermocouples 26 and 28.

The single output of the upper comparator leads to the coil of a relay; in like manner, the single output from the lower comparator leads to the coil of a second relay. The contacts of these relays are joined by suitable wires to system controller 40.

If desired, another condition sensing device may be provided in association with the system controller 40 requiring sensing of a particular condition in the containment vessel 10 or other area being protected before suppressant release is accomplished. An exemplary sensing condition device in this respect could be a pressure switch, an ion detector, or a UV detector, or other equivalent detection means.

Although for illustration purposes only, the blower 46 is depicted as being associated with the outlet duct 18 of vessel 10, it is to be appreciated that the blower 46 may be located at any desired point in the pneumatic conveying system.

OPERATION

In operation, the thermocouples 26 and 28 sense the temperature of the air stream exiting from containment vessel 10 through discharge duct 18. If the temperature of the air stream rises suddenly evidencing the commencement of a fire or an incipient explosion, the thermocouple 26 reacts to such temperature rise during a certain interval of time at a much faster rate than thermocouple 28 because the thick walled sleeve 36 functions as a heat sink which prevents the probe therein from reacting to the temperature rise at the same rate as the probe of thermocouple 26.

Accordingly, during normal operation of the containment vessel 10, the voltage output from thermocouples 26 and 28 received by the upper and lower comparators within controller 38 is not sufficient to cause either of the relays joined to such comparators to be energized. This is true even though temperature fluctuations occur that are below a preset lower alarm temperature. However, if a sudden temperature rise occurs causing the probe 26 to produce an output voltage that is not immediately directly offset to a predetermined extent by the voltage from probe 28, that voltage applied to the lower comparator of the controller 38 causes the coil of the relay associated therewith to be energized thus sending a signal to system controller 40 which, for example, can result in an alarm being actuated in the nature of a light, and typically an audible signal.

On the other hand, if the sudden temperature rise exceeds a predetermined high level, the voltage input to the upper comparator is such that the relay connected thereto is energized thus causing a signal to be sent to the system controller which deactivates the motor 44 of blower 46 through process control 42. If at the same time, the additional condition sensing device such as a pressure switch, ion detector, UV detector, photo electric, smoke, or other similar means is activated, then the suppressant release mechanism 48 is actuated.

Thus, it is evident that the sheath 36 around thermocouple probe 38 of sensor 28, which is thicker than the sheath around probe 30 of sensor 26, causes the temperature response of the sensor 28 to lag behind the temperature response of the sensor 28 to a rise in temperature of air flowing therepast, when such temperature rise occurs within a predetermined short interval of time. Stated otherwise, the sheath 36 is comprised of heat sink material which causes the described temperature response lag in the sensor 28, as compared with that of sensor 26.

In any event, it is to be understood that deactivation of the blower system will diminish the effect of a fire so that it will not spread throughout the duct system or to other associated equipment. As a consequence, upon release of a suppressant, it is more effective in controlling a fire or explosion.

Although not illustrated in the drawings, it is to be understood that additional detectors may be provided in vessel 10 or the associated processing equipment for detecting hazardous conditions. Exemplary in this respect would be smoke, fiber optic, infrared, ultraviolet, photoelectric, or ionization detectors, any one of which or combinations thereof are connected to system controller 40.

I claim:

1. In a fire and/or explosion protection system wherein process air is directed to an inlet of a containment enclosure for processing of the air therein, with the air then being discharged through an outlet in the enclosure, apparatus for activating fire and/or explosion suppression or isolated equipment for the enclosure comprising:

first and second temperature sensing means positioned in an air flow downstream of said inlet to the containment enclosure for sensing a temperature of the air, each of the temperature sensing means including a thermocouple sensor housed within a protective sheath;

means for causing one of the thermocouple sensors to be responsive to a rise in the temperature of the air flowing therepast at a slower rate than a rate at which the other thermocouple sensor responds to said rise in the air temperature, when the temperature rise occurs within a predetermined certain interval of time, the means for causing said one thermocouple sensor to be responsive to said rise in the temperature at the slower rate than that of the other thermocouple sensor comprising a quantity of heat sink material forming the sheath around said one thermocouple;

means mounting said temperature sensing means in sufficiently proximal relationship that the temperature of the air flowing therepast is not substantially different at any one point in time, said mounting means also serving to orient said temperature sensing means in respective positions where the sensing means each present a free end and with the sensing means spaced from one another a sufficient distance to preclude contact therebetween during any temperature rise in said air as sensed by both of the temperature sensing means; and control means connected to said first and second temperature sensing means for activating the suppression or isolation equipment in response to a predetermined differential in the temperature of said air as sensed by said first and second temperature sensing means during said certain time interval.

2. Apparatus as set forth in claim 1, wherein said first and second temperatrue sensing means are positioned adjacent the outlet from the containment enclosure.

3. Apparatus as set forth in claim 1. wherein is provided a duct connected to the outlet of the containment enclosure, said first and second temperature sensing means being mounted in the duct in proximal relationship to the containment enclosure.

4. Apparatus as set forth in claim 3, wherein said first and second temperature sensing means are located in generally opposed relationship.

5. Apparatus as set forth in claim 4, wherein said duct mounting said first and second temperature sensing means is in a generally horizontal position, the first and second temperature sensing means being located in substantially horizontally opposed relationship.

6. Apparatus as set forth in claim 5, wherein said first and second temperature sensing means are thermocouples each provided with an elongated probe, said probes being located in generally aligned, horizontally opposed, end-to-end, spaced relationship.

7. Apparatus as set forth in claim 1, wherein the sheath surrounding each of the temperature sensors is a metallic sleeve.

8. Apparatus as set forth in claim 7, wherein one of said sleeves is formed of metallic material having a thickness, and a diameter, said diameter of the one sleeve being at least twice a diameter of the sensor housed therewithin.

9. Apparatus as set forth in claim 1, wherein said first and second temperature sensing means are thermocouples each having a temperature probe, both of the probes being sheathed with a light gauge metal, while one of the probes has a heavy wall metal member over the metal sheath thereof.

10. Apparatus as set forth in claim 9, wherein said light gauge metal is of the order of about 0.015 inch in thickness.

11. Apparatus as set forth in claim 10, wherein said heavy wall metal member has a wall thickness of about ¼ inch.

12. Apparatus as set forth in claim 9, wherein said heavy wall metal member has a wall thickness of the order of about ⅛ to about ½ inch.

13. In a fire and/or explosion protection system wherein process air is directed to an inlet of a containment enclosure for processing of the air therein, with the air then being discharged through an outlet in the enclosure, apparatus for activating fire and/or explosion suppression or isolation equipment for the enclosure comprising:

first and second temperature sensing means positioned in the air downstream of said inlet from sensing a temperature of the air, wherein each of said temperature sensing means has a temperature response rate at which each of said temperature sensing means is responsive to a change in the air temperature;

activating means connected to said first and second temperature sensing means for activating said equipment in response to a predetermined differential in temperature as sensed by said first and second temperature sensing means during a certain time interval; and temperature response rate changing means for changing at least one of said temperature response rates such that the temperature response rate for said first temperature sensing means is different from the temperature response rate for said second temperature sensing means, each of the temperature sensing means including a temperature sensor, the temperature response rate changing means comprising at least two protective sheaths, and each of said temperature sensors being housed within a respective said protective sheath.

* * * * *